United States Patent [19]
Hosier

[11] Patent Number: 5,654,755
[45] Date of Patent: Aug. 5, 1997

[54] SYSTEM FOR DETERMINING A VIDEO OFFSET FROM DARK PHOTOSENSORS IN AN IMAGE SENSOR ARRAY

[75] Inventor: Paul A. Hosier, Rochester, N.Y.

[73] Assignee: Xerox Corporation, Stamford, Conn.

[21] Appl. No.: 583,372

[22] Filed: Jan. 5, 1996

[51] Int. Cl.$^6$ .................................................. H04N 9/64
[52] U.S. Cl. .................... 348/245; 348/244; 348/307; 358/463
[58] Field of Search ............................ 348/241, 243, 348/533, 607, 242, 244, 245, 302, 303, 304, 307, 308; 358/813, 814, 463, 474, 482, 483; H04N 5/217, 9/64

[56] References Cited

U.S. PATENT DOCUMENTS

| | | | |
|---|---|---|---|
| 4,293,877 | 10/1981 | Tsunckawa et al. | 358/213 |
| 4,412,343 | 10/1983 | Kosonocky | 377/58 |
| 4,498,105 | 2/1985 | Crawshaw | 358/213 |
| 4,630,121 | 12/1986 | Suzuki et al. | 358/227 |
| 4,649,430 | 3/1987 | Hynecek | 358/213 |
| 4,941,051 | 7/1990 | Hicks | 358/213.16 |
| 5,047,861 | 9/1991 | Houchin et al. | 358/213.15 |
| 5,105,276 | 4/1992 | Schrock | 358/213.16 |
| 5,181,118 | 1/1993 | Kimura | 358/213.16 |
| 5,252,818 | 10/1993 | Gerlach et al. | 250/208.1 |
| 5,268,765 | 12/1993 | Yamashita | 358/213.31 |
| 5,278,658 | 1/1994 | Takase | 358/213.15 |
| 5,355,164 | 10/1994 | Shimoyama et al. | 348/243 |
| 5,376,966 | 12/1994 | Takase | 348/243 |
| 5,452,001 | 9/1995 | Hosier et al. | 348/230 |

*Primary Examiner*—Andrew Faile
*Assistant Examiner*—Ngoc-Yen Vu
*Attorney, Agent, or Firm*—R. Hutter

[57] ABSTRACT

In a photosensitive device wherein voltages are read sequentially from a dark, or dummy, photosensor and a plurality of active photosensors with each of a series of scans, a circuit downstream of the photosensors resets the offset value of the voltage signals, based on successive voltage readings from the dark photosensor. An RC circuit in parallel with the video line maintains a running average of readings from the dark photosensor over a large number of scans. This averaging of many dark-pixel readings averages out short-term thermal noise on the dark photosensor, for a truer offset value.

8 Claims, 6 Drawing Sheets

SYSTEM FOR DETERMINING A VIDEO OFFSET FROM DARK PHOTOSENSORS IN AN IMAGE SENSOR ARRAY

FIELD OF THE INVENTION

The present invention relates to image sensor arrays used in raster input scanners. In particular, the invention relates to photosensitive chips wherein each photosensor outputs signals onto a common video line, and where there is provided dark photosensors for setting an offset level on the common video line.

BACKGROUND OF THE INVENTION

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging without reductive optics. In order to provide such a "full-width" array, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch.

Although most scanning systems currently in use are ultimately digital systems, the "raw signal" coming out of the photosensors during the scanning process is an analog video signal, with the voltage magnitude corresponding to the intensity of light impinging on the photosensor at a given time. Thus, when signals are readout from the photosensors on a chip to be converted to digital data, different video levels, corresponding to the brightness of the reflected area being scanned by a particular photosensor at a particular moment, are output as a series of analog voltage levels.

Photosensitive devices may be one-dimensional or two-dimensional, and can be either of the "active" variety, wherein the photosensors output voltage signals, or in the form of a charge-coupled device, or CCD, which outputs a sequence of charges from a series of individual photosensors. In all of these various types of photosensitive devices, a common design feature is the use of "dark" photosensors, which are used to periodically reset the offset voltage for the photosensors being read out. These dark photosensors are of the same semiconductor structure as the other "active" photosensors on each chip, but the dark photosensors are not exposed to light. In most designs, the dark photosensors are provided with an opaque shield, such as of aluminum or silicon, to prevent the influence of light thereon. In the scanning process, with each readout cycle of active photosensors on each chip, the readout of the first photosensor is proceeded by readouts of one or more dark photosensors, which are used to reset the voltage offset associated with the whole chip, and thereby correct signal drift when the active photosensors are reading out their signals. In other words, the readout of a dark photosensor with each scan can serve as a reference offset or "zero point" so that the absolute values of light intensity on the active photosensors may be determined. The use of a dark photosensor output when reading out signals from active photosensors can significantly compensate for performance variations of multiple chips in a single apparatus, and also for changes in the performance of a photosensitive device over time.

DESCRIPTION OF THE PRIOR ART

In the prior art, U.S. Pat. No. 4,649,430 discloses a CCD imager having serial output shift registers, wherein a dark reference area is located at the edge of an image area. The dark reference signals are clocked into an opposite end of the serial shift register from the output amplifier.

U.S. Pat. No. 4,941,051 discloses a circuit for processing signals from a series of photosensors. The circuit comprises a low pass filter for receiving the output signals and for filtering a plurality of reference level signals and a corresponding plurality of radiation level signals to minimize high frequency noise and to generate filtered and averaged reference level and radiation level signals. A difference circuit generates a signal related to the difference between the filtered reference level and filtered radiation level signals. The duration of output voltages relating to a signal is half the length of the total sampling period, so that the remaining half of the sampling period the reference voltage can be generated. Thus, with every output of each photosensor, there is generated both a reference signal and an output signal with each cycle.

U.S. Pat. No. 5,105,276 discloses removing errors from the sampling of photosensors of a solid state imager by controllably clocking an analog to digital converter to which the sampled photosensor signals are applied, so that the converter digitizes successive photosensor samples only during those times that are exclusive of switching transitions occurring during the sampling of the photosensors.

U.S. Pat. No. 5,181,118 discloses a method of correcting an image signal from an image sensor having both a dark photosensor and an active photosensor. Initial offset data is determined from the dark photosensor, and with each reading of a dark photosensor, offset correction data is determined from the difference between the latest offset data and initial offset data. This correction of signal data is performed entirely after the various signals have been converted from analog to digital.

U.S. Pat. No. 5,268,765 discloses an image sensor wherein a dark photosensor can be selectively activated by means of an externally-connected line, to establish a dark output reference level when needed.

U.S. Pat. No. 5,278,658, of which U.S. Pat. No. 5,376,966 is a divisional, discloses a photoelectric conversion element having dark signal photosensors ("shielded cells") and active photosensors. A dark signal data generating system generates dark signal data for each cell of the element, the dark signal data corresponding to a ratio of an image signal output from each cell under a no-exposure condition to a first reference dark signal which is obtained from the shielded cells. Because the system operates with a CCD, a subtracter is required for subtracting the dark signal component from an image signal obtained for each corresponding exposed cell.

U.S. Pat. No. 5,355,164 discloses a method of correcting image read signals including the steps of reading an image line by line by a linear sensor; determining an average value of a plurality of lines of a plurality of blind (i.e., dark) photosensors of the linear sensor array; computing the signals read from the image by using the average value to correct an influence of a dark current of said linear sensor; and outputting the computed signal as the image read signal.

Because this disclosure is directed to a CCD, the average dark current must be subtracted from the active signals.

U.S. Pat. No. 5,452,001 discloses a linear array of photosensors arranged on a plurality of butted chips. Each chip includes a set of dark photosensors which are readout immediately before reading out the active photosensors. The analog video signal from the first active photosensor on each chip is readout for an extended period relative to the readout of other photosensors on the chip, to provide extra settling time for the signal from the first active photosensor.

SUMMARY OF THE INVENTION

According to the present invention, there is provided a photosensitive device comprising a set of active photosensors, each active photosensor outputting a voltage signal representative of light intensity thereon, and a dark photosensor, the dark photosensor being adapted to receive no light thereon. A video line receives voltage signals in sequence from the dark photosensor and each active photosensor of the set of photosensors. A correction capacitor, associated with the video line, retains a correction charge thereon to influence the voltage signals from the active photosensors. Means are provided for determining the correction charge on the correction capacitor, including means for sampling a plurality of voltage signals from the dark photosensor over time and deriving the correction charge based on a plurality of sampled voltage signals from the dark photosensor.

DETAILED DESCRIPTION OF THE INVENTION

Figure 1:
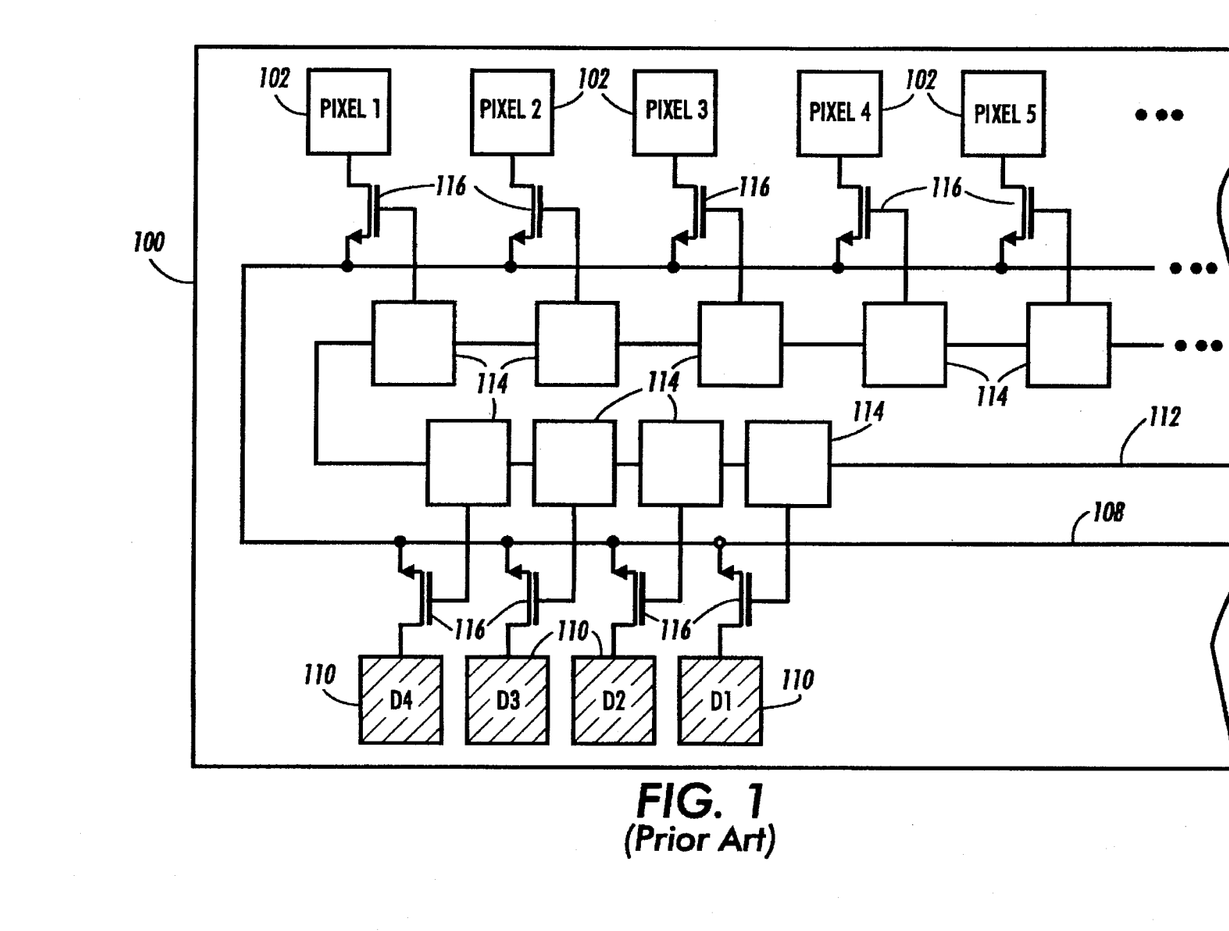
FIG. 1 is a plan view of the relevant portions of an active photosensitive device having dark photosensors and active photosensors reading to a common video line.

FIG. 1 is a simplified plan view showing a configuration of photosensors on a single active photosensor chip 10. Such a chip would be found, for example, in a raster input scanner (RIS) having a linear array of photosensors, as would be used, for example, in a digital copier or scanner. As is well known, such a chip can be exposed with a thin line of dark and light areas from an original hard-copy image; over time, the original hard-copy image is moved relative to the chip, so that each individual photosensor on the chip is exposed to a sequence of small areas on the original image. A typical raster input scanner may include a single chip which, in combination with reduction optics, is exposed to an entire width of a page being scanned; or alternately could include a plurality of such chips, butted end-to-end, which together form a single page-width linear array of photosensors.

In the plan view of FIG. 1, there is shown a long array of active (i.e., photosensitive) photosensors 102 which share a common video line 108 with a plurality of "dark photosensor" photosensors 110, which are individually indicated as D1–D4. Also associated with the photosensors 102 and 110 is a shift register line 112 which connects a series of shift register select switches 114. The shift register select switches 114 have associated therewith a series of transistor switches 116. When each transistor switch 116 is activated, the transistor switch permits the charge from its associated individual photosensor 102 or 110 to be readout through the switch 116 onto the common video line 108. There is thus run through the line of shift register switches 114 on line 112 digital information in the form of a string of 0's with a single "1" therein. As the string of digits moves through the shift register switches 114 along line 112, the single "1" activates the photosensors in a sequence as it moves down the input line 112, thereby causing the photosensors 108 and 102 to output the signals thereon, in order, onto video line 108.

In the particular design of FIG. 1, the first photosensors to be activated with each scan are the dark photosensors 110, followed by the active photosensors 102. As mentioned above, the dark photosensors 110 are typically of the same general structure as the active photosensors 102, except that they are not exposed to light in any way. Typically, the dark photosensors 110 are shielded from light, such as with a layer of aluminum. Because both the dark photosensor photosensors 110 and active photosensors 102 are created in the same chip, they will be as physically similar as possible, so that any systemic process variation or parasitic effect of the active photosensors 102 will be equally apparent in the dark photosensors 110. In this way, with each scan of video signals the dark photosensors in effect recalibrate the chip by establishing a video signal consistent with no light impinging on a photosensor. Once this offset is determined, systemic errors in the outputs of the active photosensors can be compensated for.

Figure 2:
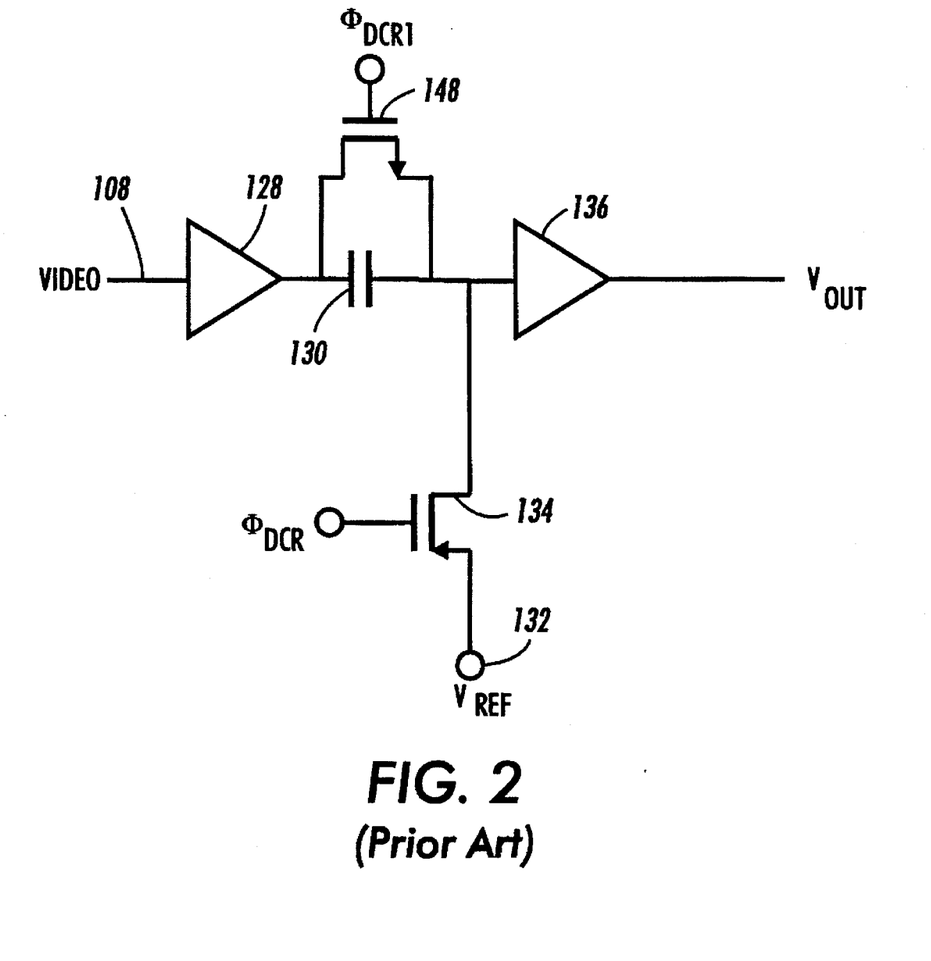
FIG. 2 is a schematic of a simple circuit for causing dark photosensor signals to determine an offset for subsequent active photosensor video signals.

A simple apparatus for carrying out the operation of causing the dark photosensors to determine the offset for the active photosensor which are subsequently read out on video line 108 is shown in FIG. 2. The circuit shown in FIG. 2 is intended to be immediately downstream of the active photosensors on video line 108. Following passage through a unity-gain amplifier 128, there is provided on video line 108 a capacitor 130, which will specifically be referred to as "correction capacitor" 130. Correction capacitor 130 retains a charge thereon which influences the magnitude of voltage signals from active photosensors which are read out through video line 108. Because of the relatively high speeds of reading out active photosensors with each scan, the charge on correction capacitor 130 will remain reasonably constant through every readout sequence. In order to place an original charge on correction capacitor 130, that is, a charge on correction capacitor 130 which will influence the magnitude of voltage signals in a desirable manner, the correction charge on correction capacitor 130 is fixed with every scan when the dark photosensors 116 are read through video line 108.

In a typical embodiment of a chip such as 100 with four dark photosensors 110, the selection of four dark photosensors is mandated mainly by standard engineering practice; typically, only one such dark photosensor, such as dark photosensor D3, is used to determine the offset for the subsequent readout of active photosensors. At the beginning of each readout, when it is the turn of dark photosensor D3 to output its dark photosensor signal onto video line 108, a reference voltage, from a source 132 in parallel to the video line 108, is activated, such as through a switch 134. The output of the dark photosensor D3 of dark photosensors 110, simultaneous with the application of reference voltage $V_{REF}$ on the other side of correction capacitor 130, has the effect of placing on correction capacitor 130 a charge, referred to as the "correction charge," representative of both the dark photosensor signal and $V_{REF}$. There may also be other circuits along video line 108, which are here summarized as the influence of an extra unity gain amplifier, indicated as 136.

As soon as dark photosensor D3 of dark photosensors 110 has output its dark signal onto video line 108 the transistor 134 goes low, shutting off $V_{REF}$ on video line 108, and leaving a residual correction charge on correction capacitor 130. Henceforth, for all subsequent signals on video line 108 until the next operation on dark photosensor D3, the output of $V_{OUT}$ on video line 108 is:

$$V_{OUT}=(V_n-V_{D3}+v_{na}+v_{nd})+V_{REF}+V_{OS}$$

where $V_n$=the output of an active photosensor n; $v_{na}$=active photosensor noise; $v_{nd}$=dark photosensor noise; $V_{D3}$=the voltage signal from dark photosensor 3; and $V_{OS}$=the offset contributed by other circuitry, symbolized by unity gain amplifier 136. The signal from dark photosensor 3 will, through correction capacitor 130, influence the magnitude of all voltage signals from the active photosensors 102 through the whole scan. In this FIG. 2 embodiment, the particular influence of $V_{D3}$ will last only until the next scan when dark photosensor D3 is again caused to set the charge on correction capacitor 130.

One practical problem with the simple implementation of FIG. 2, which has been identified as significant in high-precision scanners, is the influence of thermal noise on dark photosensor D3, which is symbolized in the above equation by $v_{nd}$. This thermal noise $v_{nd}$ may significantly change with each scan. The thermal noise on dark photosensor D3 has a pernicious influence, because the noise on dark photosensor D3 will ultimately influence the magnitude of the voltage signal from every single active photosensor in the scan, and may vary significantly from scan to scan. It is a purpose of the present invention to provide a system by which the influence of thermal or other noise on dark photosensors, which influence the offset voltage of the entire chip, is minimized.

Figure 3:
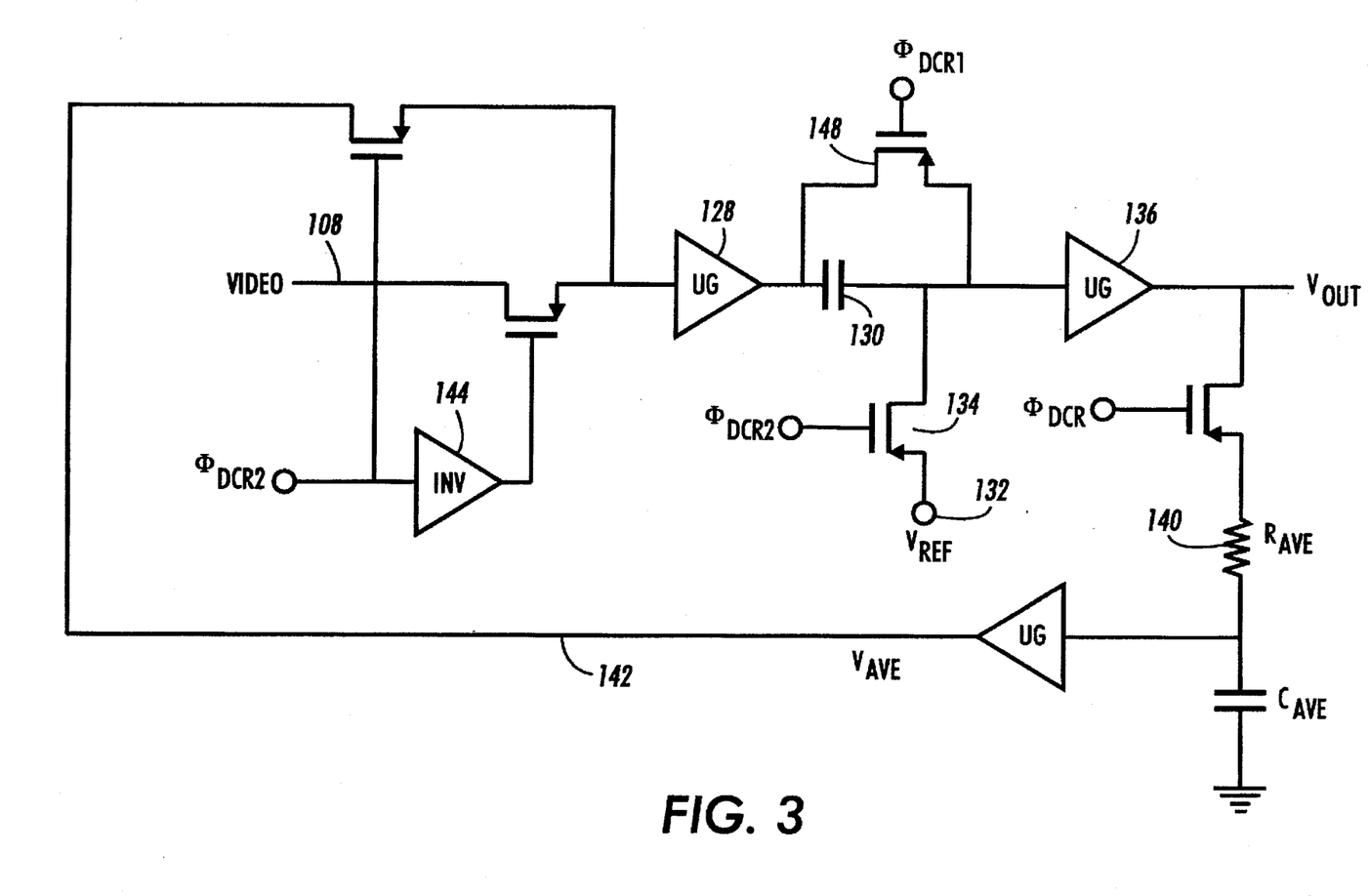
FIG. 3 is a schematic diagram of a circuit, according to a preferred embodiment of the present invention, showing a circuit for determining an offset for a video line from dark photosensor signals.

FIG. 3 is a schematic diagram of a simple embodiment of a dark photosensor offset circuit according to the present invention. It will be noted that the circuit of FIG. 3 shares key similarities with the simple circuit of FIG. 2: the circuit of FIG. 3 is disposed at the end of the video line 108, so as to receive signals from both the dark photosensors 110 and the active photosensors 102. There is also a unity gain amplifier 128, and correction capacitor 130 on the video line. As in the FIG. 2 circuit, a reference voltage $V_{REF}$ is available to the video line 108 through transistor 134.

A significant feature of the embodiment of FIG. 3 is an RC circuit, indicated as 140, in parallel with the video line 108. This RC, in turn, is connected through an average voltage line 142 (which may include a unity-gain amplifier as shown), to selectably apply an average voltage $V_{AVE}$ to the video line 108 when activated by switching means 144. There is also provided in the circuit of FIG. 3 a bypass switch 148, which, as shown, causes correction capacitor 130 to be bypassed on video line 108 when a voltage is applied thereto.

Figure 4:
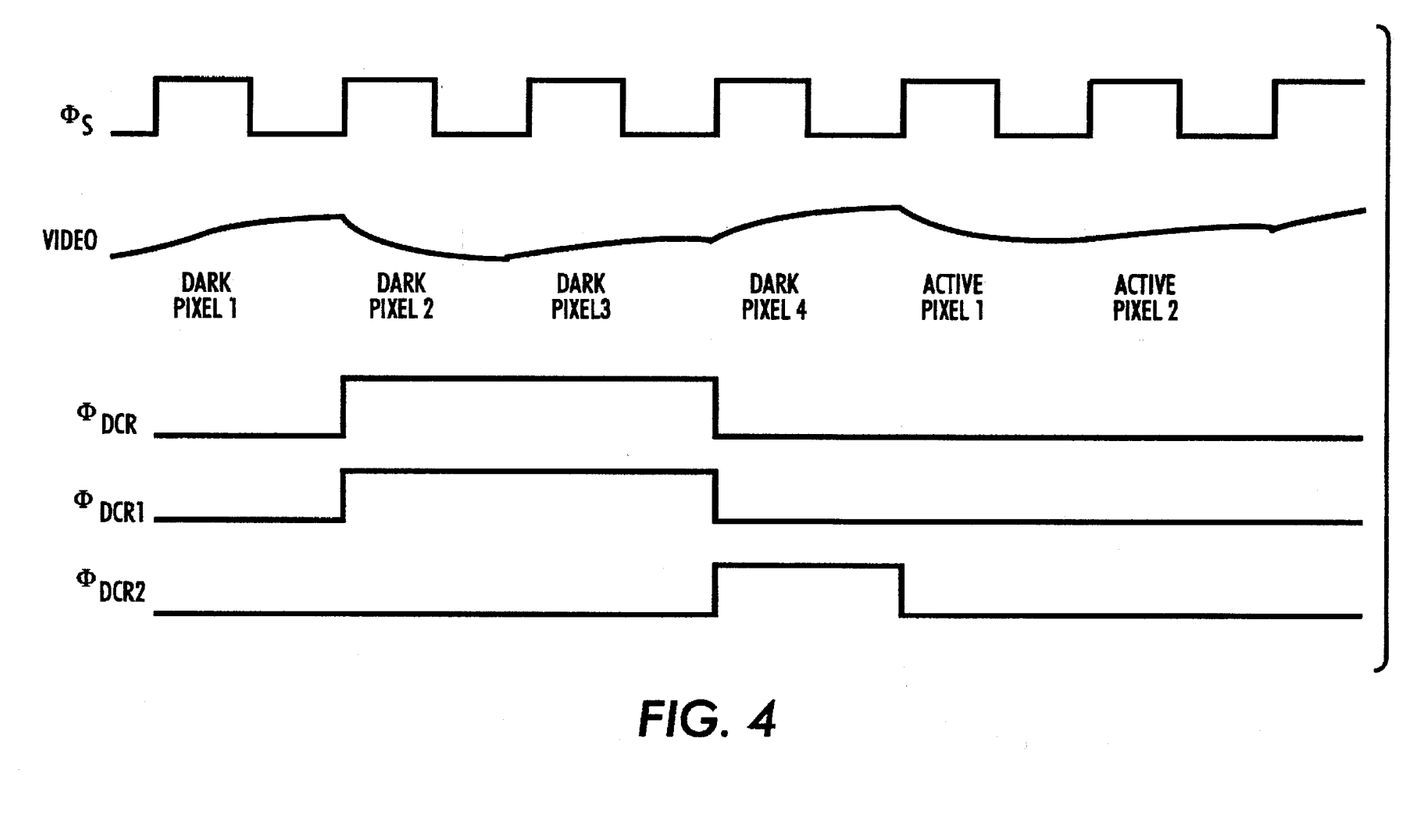
FIG. 4 is a comparative timing diagram of different waveforms for operating the transistors in the circuit of FIG. 3.

FIG. 4 is a set of comparative, simultaneous waveforms indicating the operation of the different switches in the circuit of FIG. 3, during the time in which dark photosensors, such as dark photosensor D2 and dark photosensor D3 of dark photosensors 110, are used to set the offset for the readout of active photosensor 102 for each scan. Waveform $\phi_s$, at the top of FIG. 4, shows the clock pulses by which video signals from dark photosensors 110 or active photosensors 102 are read out on video line 108. The video line shown in FIG. 4 gives an example of the typical behavior of voltages on video line 108 with each clock cycle $\phi_s$: as can be seen, the magnitude of the voltage on video line 108 starts on a new tendency (i.e., the voltage moves toward a new plateau, depending on the light intensity on the particular photosensor) with every complete cycle of $\phi_s$. It will also be noted that even though dark photosensors are shielded from light and are technically supposed to output no voltage, there will inevitably be some sort of DC-level variations from dark photosensors 110.

The waveforms $\phi_{DCR}$, $\phi_{DCR1}$, and $\phi_{DCR2}$ in FIG. 4 illustrate the operation of the corresponding switches in the circuit of FIG. 3, such as the switch in RC circuit 140 associated with switching means 144 and bypass switch 148. ("DCR" stands for "DC restore.") When dark photosensor D2 and dark photosensor D3 of dark photosensors 110 are reading out their signals onto video line 108, it can be seen that $\phi_{DCR}$ and $\phi_{DCR1}$ go high: $\phi_{DCR}$ connects RC circuit 140 to video line 108, and $\phi_{DCR1}$ activates bypass switch 148, which causes the signal on video line 108 to bypass correction capacitor 130. Thus, when dark photosensor D2 and dark photosensor D3 are readout on video line 108, their signals pass through video line 108, through bypass switch 148, and contribute charge to the RC circuit 140.

The RC circuit 140 functions as an averaging circuit which samples the video from both the dark photosensor D2 and dark photosensor D3 with every scan on video line 108. The values of R and C of the RC circuit 140 should be set so that samples of the video signals from dark photosensor D2 and dark photosensor D3 over a relatively large number of scans are accumulated. In other words, R and C should provide a time constant by which the effect of numerous scans of dark photosensors D2 and D3 loaded onto the RC circuit 140 cause the RC circuit 140 to maintain a running average of the outputs of dark photosensors D2 and D3 over a large number of scanlines. For example, if it is desired to maintain a running average of 100 scanlines, then the value of RC should be set equal to 100 times the duration of the sample clock $\phi_{DCR}$ with each scan. Generally, for a practical embodiment of the present invention, the RC should be chosen to sample at least 10 scanlines, and preferably about 100 scanlines, in order to obtain its average dark photosensor signal.

RC circuit 140 thus has the effect, by its accumulation of sample charges over as many as 100 scanlines, of averaging out the random thermal noise of the individual dark photosensors. The noise on the dark photosensors will be reduced by a factor of $(n \times m)^{0.5}$, where n is the number of scanlines averaged, and m is the number of dark photosensors averaged with each scanline.

Returning to FIG. 4, it can be seen, that after the video signals from dark photosensor 2 and dark photosensor 3 are read out on video line 108 to RC circuit 140, $\phi_{DCR}$ and $\phi_{DCR1}$ go low, thus disconnecting bypass switch 148 and again isolating RC 140 from video line 108. However, simultaneous with $\phi_{DCR}$ and $\phi_{DCR1}$ going low, another clock signal, $\phi_{DCR2}$, goes high. As can be seen in FIG. 3, the effect of $\phi_{DCR2}$ going high is to activate switching means 144 and cause switch 134 to apply $V_{REF}$ from source 132 onto video line 108. In effect, the charge from RC circuit 140 is connected, through line 142, to video line 108, so that the charge on RC circuit 140 can be used to affect correction capacitor 130 on one side while $V_{REF}$ is applied to correction capacitor 130 on the other side. The charge on RC circuit 140, which as mentioned above is representative of an average of a large number of samples from dark photosensors D2 and D3 over many scanlines, is used to set correction capacitor 130 prefatory to the readout of the active photosensors on video line 108.

The setting of correction capacitor 130 in the FIG. 3 embodiment is the same as with the FIG. 2 embodiment described above, with the significant difference that, whereas the FIG. 2 embodiment merely used a single reading of a single dark photosensor to set the charge on correction capacitor 130, the circuit of FIG. 3 uses an average reading of two of dark photosensors sampled many times, this average reading being maintained by RC circuit 140.

The output for each active photosensor on video line 108, using the offset system of the FIG. 3 embodiment is thus $$V_{OUTn} = (V_n - V_{DAVE2\&3} - v_{nd}) + V_{REF} - (V_{OS} + V_{OSRC})$$

where, in addition to the variables explained in the equation above, $V_{DAVE2\&3}$ is an average of the outputs of dark photosensors D2 and D3, and $V_{OSRC}$ equals the offset on line 142 connecting the RC 140 to video line 108. It will be noted that, as a practical matter, the dark noise on an individual dark photosensor, which was symbolized as $v_{nd}$ in the equation relating to FIG. 2 above has effectively been cancelled out of existence.

If there is some distributed capacitance associated with the resistor in RC circuit 140, there will be some degradation in the number of scanlines averaged together. Also, the parasitic capacitance of the RC circuit 140 will tend to hold the last dark photosensor during the entire unsampled period, resulting in a much heavier weighting in the average of the last dark photosensor sampled. To minimize these problems, R can be made smaller and C made bigger until the total parasitic capacitance of resistor R is somewhat less than n/2×C, where n is the number of lines desired to be averaged. For a parasitic capacitance of n/2×C, the last dark photosensor sampled will be weighted twice as much as the other dark photosensors contributing to the charge on RC circuit 140.

Figure 5:
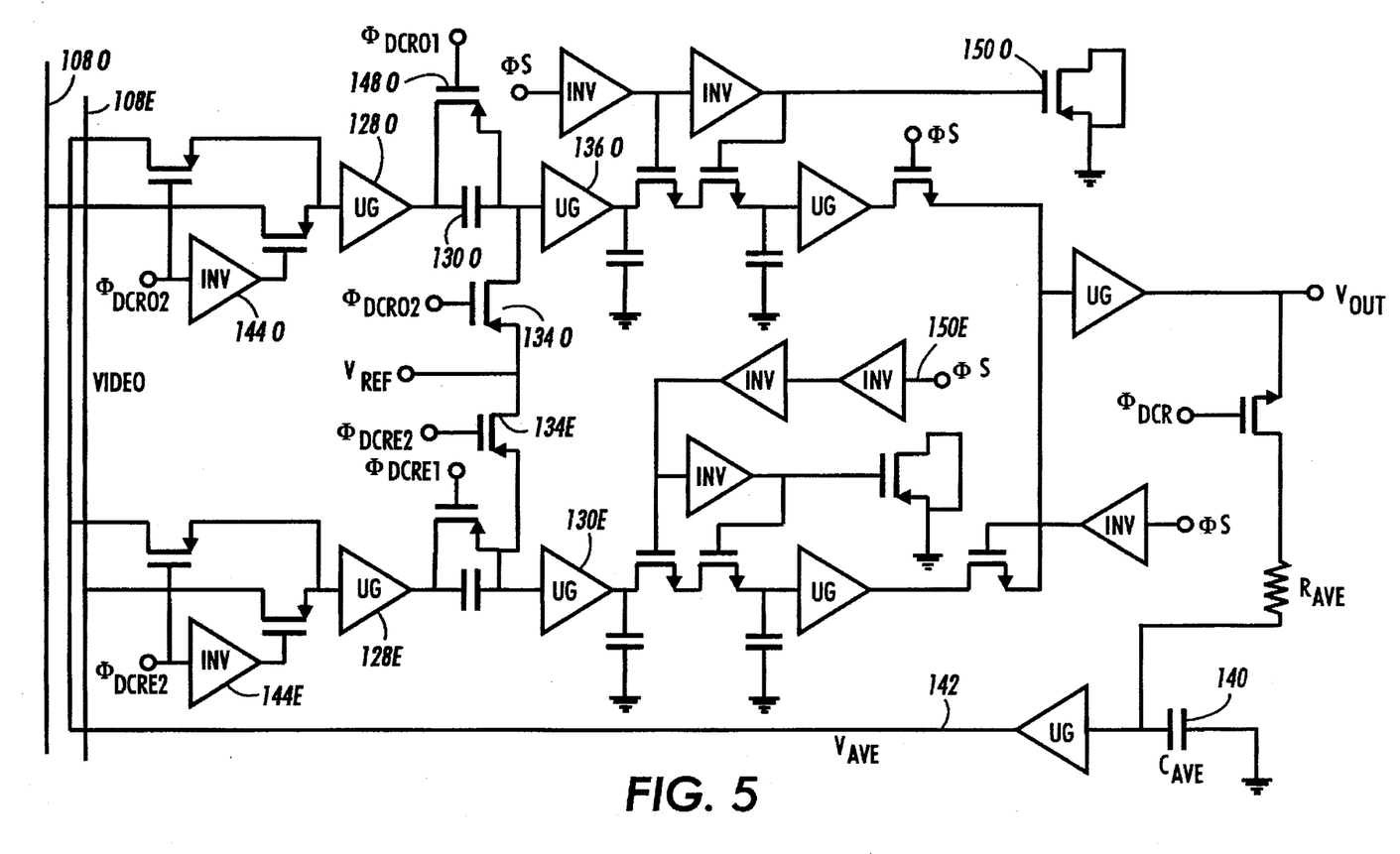
FIG. 5 is a schematic diagram of a circuit, generally similar to that of FIG. 3, adapted for use in a chip where video signals from different sets of active photosensors are multiplexed.

U.S. Pending application Ser. No. 08/444,802, assigned to the assignee hereof, discloses a high-speed technique for reading out video signals from a linear array of photosensors by multiplexing the video signals from the odd and even photosensors in the linear array. In other words, the odd photosensors output to an odd video line, while the even photosensors output to a separate even video line, and there the two trains of video signals are multiplexed together for a faster total output speed. The present invention used can be in combination with the technique of the referenced patent application, with separate video offset circuits, such as shown in FIG. 3, for the odd and even video lines. Such a circuit for use with the odd-even multiplexing technique is shown in FIG. 5. In FIGS. 4 and 5, like reference numerals indicate like elements, with a modification that reference numerals followed by the letter O are specific to the odd-signal line 108O, and reference numerals followed by E indicate elements which are specific to the even video line 108E. However, it will be noticed that certain elements in the FIG. 5 circuit, in particular RC circuit 140 line 142 and reference source 132, are common to both the odd and even video lines. Thus, the RC circuit 140 maintains a running average of dark photosensor signals of a combination of the dark photosensor on the odd video line 108O and also on the even video line 108E, even if, in certain embodiments, the two sets of dark photosensors are never otherwise connected.

Figure 6:
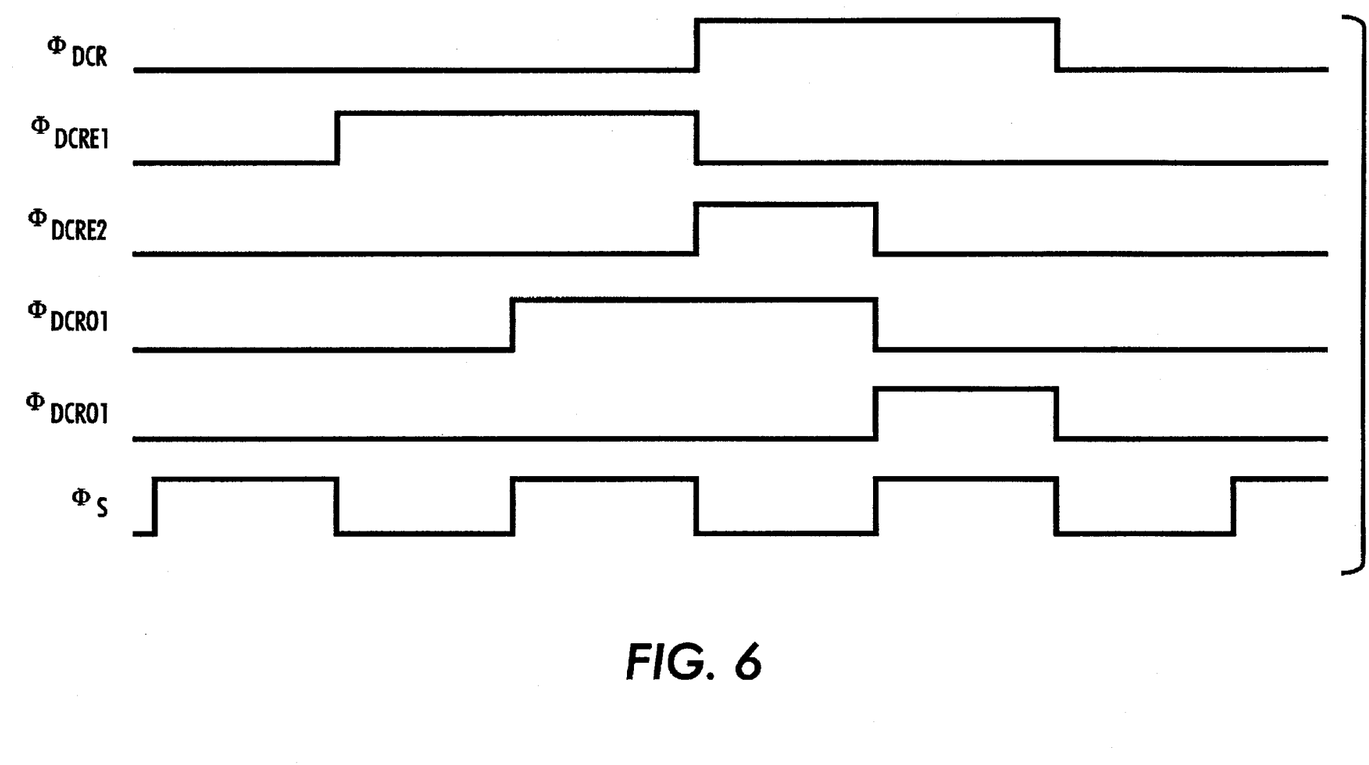
FIG. 6 is a set of comparative timing diagrams for operation of the various transistors in the circuit of FIG. 5.

Also shown in FIG. 5 is an offset-removal circuit for each video line, indicated as 150O and 150E, which are peculiar to a particular practical embodiment. FIG. 6 shows a set of comparative waveforms for activating the various transistors in the FIG. 5 circuit for multiplexed operation: the labels on the waveforms in FIG. 6 correspond to the similarly-indicated points in the FIG. 5 circuit. It will be noted that the function of circuits 150O and 150E can be used for multiplexing signals on the two separate video lines onto a single output line, if $\phi_s$ is representative of the clock signal for each video signal being read through the video lines.

In the illustrated embodiments of the present invention, the technique of determining a running average of dark-photosensor readings, and using this running average to determine a correction charge on a correction capacitor associated with the video line, is carried out with a small number of basic circuit elements, namely a resistor and capacitor. However, the invention can be manifested in other types of hardware, such as a microprocessor, which could maintain a running average of dark-photosensor readings by actual calculation, and then could synthesize a suitable voltage to place a desired correction charge on the correction capacitor.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A photosensitive device, comprising:

a set of active photosensors, each active photosensor outputting a voltage signal representative of light intensity thereon;

a dark photosensor, the dark photosensor being adapted to receive no light thereon;

a video line, adapted to receive voltage signals in a readout sequence from the dark photosensor and each active photosensor of the set of photosensors;

a correction capacitor directly connected to the video line, the correction capacitor adapted to retain a correction charge thereon to influence the voltage signals from the active photosensors; and means for determining the correction charge on the correction capacitor, said determining means including means for sampling a voltage signal from the dark photosensor over at least three readout sequences and deriving the correction charge based on a plurality of sampled voltage signals from the dark photosensor, the determining means including means for applying a reference voltage to the correction capacitor when the voltage related to a plurality of voltage signals from the dark photosensor is applied to the correction capacitor.

2. The device of claim 1, the determining means including means for applying a voltage related to an average of the plurality of voltage signals from the dark photosensor to the correction capacitor.

3. The device of claim 1, the sampling means including an RC circuit, and means for transferring a plurality of voltage signals from the dark photosensor to the RC circuit.

4. The device of claim 3, wherein the RC circuit has a time constant at least ten times a duration of a voltage signal from the dark photosensor.

5. The device of claim 3, wherein the RC circuit is in parallel with the video line.

6. The device of claim 5, wherein the correction capacitor is in series with the video line, and further comprising bypass means for selectably sending a voltage signal on the video line around the correction capacitor.

7. The device of claim 6, further comprising means for controlling the bypass means, whereby a voltage signal from a dark photosensor is sent around the correction capacitor, and voltage signals from the set of active photosensors are sent through the correction capacitor.

8. The device of claim 1, further comprising a second dark photosensor, the second dark photosensor being adapted to receive no light thereon; and wherein the determining means includes means for sampling a plurality of voltage signals from the dark photosensor and the second dark photosensor over time and deriving a correction charge based on said plurality of sampled voltage signals.

* * * * *